US012786287B2

(12) United States Patent
Kovacs et al.

(10) Patent No.: US 12,786,287 B2
(45) Date of Patent: Nov. 3, 2026

(54) CONTENT DELIVERY NETWORK (CDN) COLD CONTENT HANDLING

(71) Applicant: Akamai Technologies, Inc., Cambridge, MA (US)

(72) Inventors: Laszlo Kovacs, Foster City, CA (US); Keith E. Oslakovic, Somerville, MA (US); Mangesh Kasbekar, Cambridge, MA (US); Zewei Chen, Somerville, MA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days.

(21) Appl. No.: 17/537,598

(22) Filed: Nov. 30, 2021

(65) Prior Publication Data

US 2022/0086254 A1 Mar. 17, 2022

Related U.S. Application Data

(63) Continuation of application No. 15/620,210, filed on Jun. 12, 2017, now Pat. No. 11,190,611, which is a continuation of application No. 13/470,262, filed on May 12, 2012, now Pat. No. 9,680,952, which is a continuation of application No. 12/176,806, filed on Jul. 21, 2008, now Pat. No. 8,180,720.

(60) Provisional application No. 60/950,615, filed on Jul. 19, 2007.

(51) Int. Cl.
*H04L 67/568* (2022.01)

(52) U.S. Cl.
CPC .................................. *H04L 67/568* (2022.05)

(58) Field of Classification Search
CPC ..................................................... H04L 67/568
See application file for complete search history.

(56) References Cited

U.S. PATENT DOCUMENTS

| | | | | |
|---|---|---|---|---|
| 6,108,703 A * | 8/2000 | Leighton | H04L 67/1029 709/224 |
| 2003/0149962 A1* | 8/2003 | Willis | G06F 30/367 712/15 |
| 2004/0064512 A1* | 4/2004 | Arora | H04L 63/08 709/206 |
| 2008/0065745 A1* | 3/2008 | Leighton | H04L 61/45 709/227 |
| 2008/0071859 A1* | 3/2008 | Seed | H04L 67/563 709/203 |

(Continued)

*Primary Examiner* — Taelor Kim
(74) *Attorney, Agent, or Firm* — David H. Judson

(57) ABSTRACT

A method of content delivery in a content delivery network (CDN), where the CDN is deployed, operated and managed by a content delivery network service provider (CDNSP). The CDN comprises a set of content servers and a domain name system (DNS). For a given content provider, a determination is first made whether the content provider has "cold content" delivery requirements by evaluating one or more factors that include: total content size, size of content objects expected to be served, uniqueness of content, total number of content objects, and a percentage of the total content size that is expected to account for a given percentage of traffic. Upon a determination that the content provider has cold content delivery requirements, a subset of the CDN content servers are configured to implement a set of one or handling rules for managing delivery of the cold content from the CDN content servers.

10 Claims, 5 Drawing Sheets

(56) References Cited

U.S. PATENT DOCUMENTS

2008/0082648 A1 * 4/2008 Ahmed ................. H04L 67/568
709/217

* cited by examiner

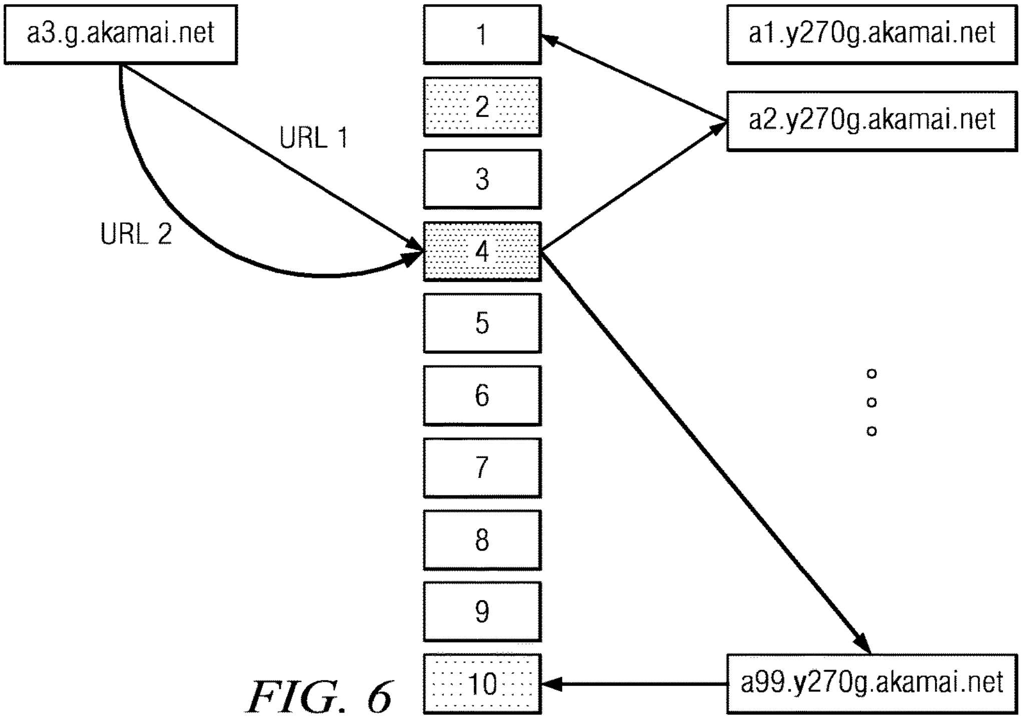
FIG. 6
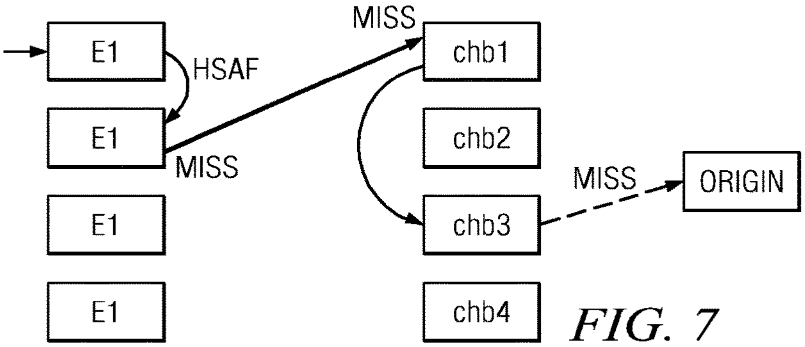
FIG. 7
| TOTAL FOOTPRINT | PEAK TRAFFIC | TOTAL OBJECTS | SOLUTION |
|---|---|---|---|
| < 200 GB | < 2 gbps | < 2 MILLION | CONFIG A |
| | > 2 gbps | ANY | CUSTOM? CONFIG C? |
| 200 GB TO 1 TB | < 200 mbps | < 10 MILLION | CONFIG B |
| | > 200 mbps | ANY | CUSTOM? CONFIG C? |
| > 1 TB | ANY | ANY | CUSTOM? |
| ANY | ANY | > 10 MILLION | CUSTOM? |
FIG. 8

CONTENT DELIVERY NETWORK (CDN) COLD CONTENT HANDLING

BACKGROUND

Technical Field

The present invention relates generally to content delivery in distributed networks.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS query handling, provisioning, data monitoring and reporting, content targeting, personalization, and business intelligence. The term "outsourced site infrastructure" means the distributed systems and associated technologies that enable an entity to operate and/or manage a third party's web site infrastructure, in whole or in part, on the third party's behalf.

Cold content is any web site content that is requested infrequently by end users and, as a result, is unlikely to stay in CDN cache long enough to improve origin off-load. Typically, a CDN content server removes content based on some type of caching rule, such as a least-recently-used (LRU) basis. This means that the infrequently requested objects are generally the first ones removed from a CDN server cache to make room for new content. Unfortunately, in the case of CDN customers with large quantities of cold content, it is likely that one object will be replaced with another equally cold object. Social networking and auction sites are particularly likely to have this problem because they have vast amounts of content but only a very select subset of that content is of interest to a broad range of users. This is sometimes called the "long-tail" problem.

For example, consider a site with one terabyte of content. Of this content, assume that 500 MB is requested more than once per week on any given CDN edge server. The remaining 999.5 gigabytes, however, is requested at most once per week. This large amount (in this example, 999.5 gigabytes) of content is the so-called "long tail." It is content that is "cold." Of course, the numbers given above are merely illustrative. A long tail situation may be deemed to exist with respect to a particular site for which any given percentage (e.g., 90% or more) of the content will rarely be requested.

Cold content in general, and long tails in particular, present some special challenges for a CDN service provider, including low origin server off-load (low cache hit rates) due to the content being evicted from cache before it can be requested again, cache contention and the potential to monopolize the cache to the detriment of other CDN customers, and sensitivity to load spikes that can occur with purges or CDN server region outages.

BRIEF SUMMARY

This subject matter herein relates generally to various techniques by which a content delivery network (CDN) service provider can manage the handling of cold content in its network.

In particular, a method of content delivery is implemented in a content delivery network (CDN), where the CDN is deployed, operated and managed by a content delivery network service provider (CDNSP). The CDN comprises a set of content servers and a domain name system (DNS) associated with a CDN namespace. For a given content provider, a determination is first made whether the content provider has "cold content" delivery requirements, e.g., by evaluating one or more factors that include: total content size, size of content objects expected to be served, uniqueness of content, total number of content objects, and a percentage of the total content size that is expected to account for a given percentage of traffic. Upon a determination that the content provider has cold content delivery requirements, a subset of the CDN content servers are configured to implement a set of one or handling rules for managing delivery of the cold content from the CDN content servers.

A given CDN content server comprises a processor, an operating system, a cache, and a memory in which content provider-specific metadata is stored in a configuration file. The content provider-specific metadata describes the set of handling rules for given content provider cold content. The server also includes code executable by the processor for receiving an incoming request for given content provider cold content, for applying one of the set of handling rules, and for serving the content provider cold content in accordance with the handling rule.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 illustrates a hash serial and forward technique;

FIG. 7 illustrates a multi-tier cache hierarchy technique; and

FIG. 8 is a table illustrating several possible cold content site configurations.

DETAILED DESCRIPTION

Figure 1:
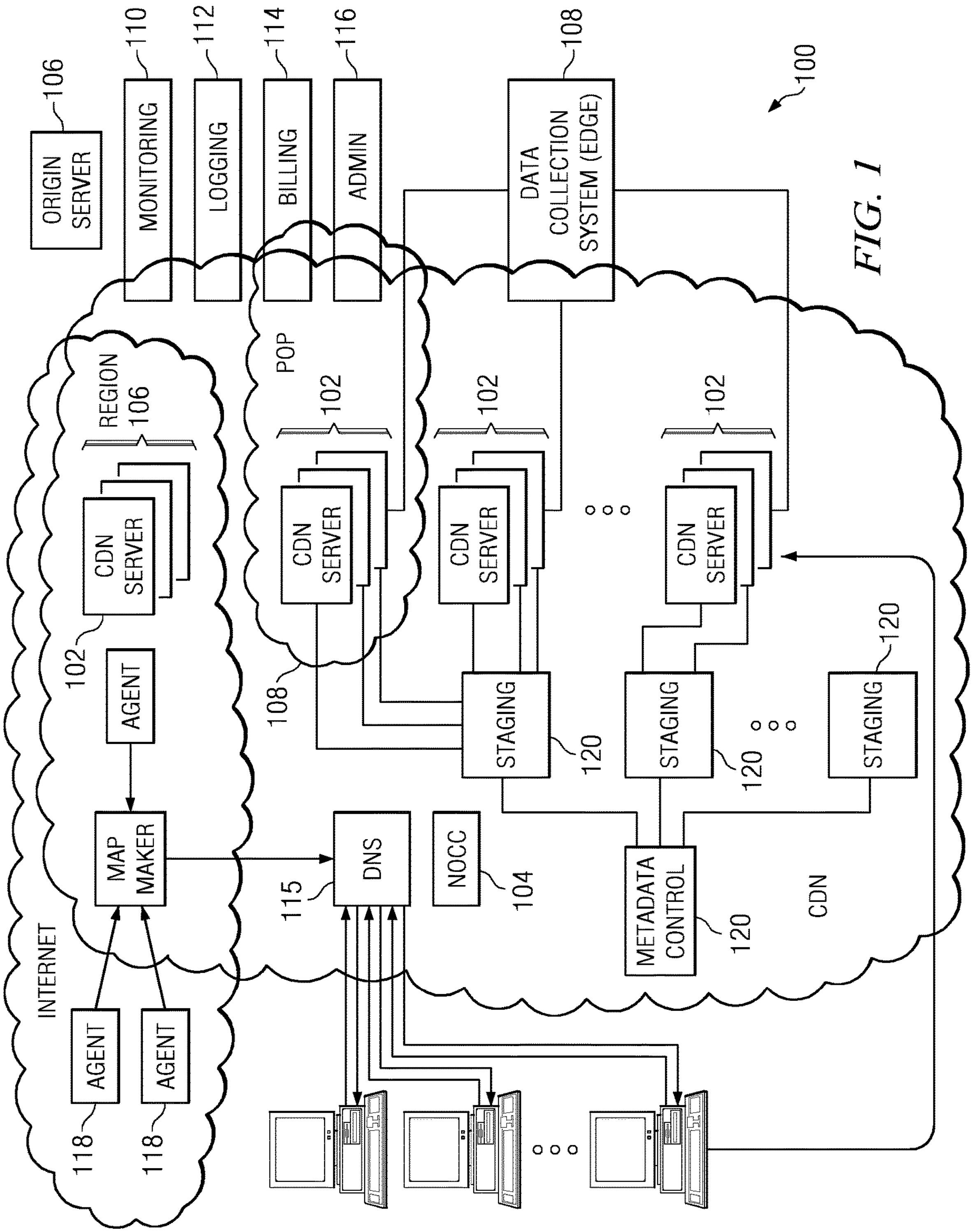
FIG. 1 is a representative content delivery network in which the present invention may be implemented.
Figure 2:
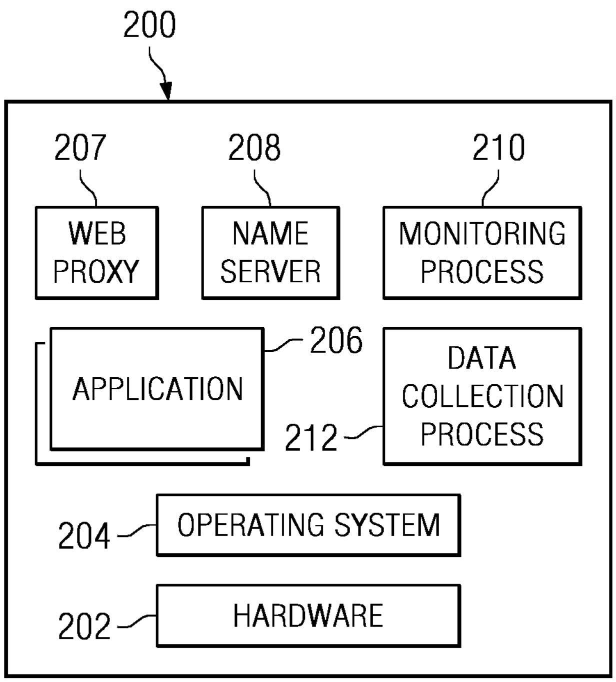
FIG. 2 is a representative edge server of the content delivery network of FIG. 1.

The subject matter herein may be implemented in a content delivery network, such as illustrated in FIGS. 1 and 2. Use in a CDN is a not a limitation, however, as the subject matter may be implemented in any environment in which one entity operates a distributed network from which third party content is distributed.

In a representative embodiment, a distributed computer system 100 is configured as a CDN and is assumed to have a set of machines 102*a-n* distributed around the Internet. Typically, most of the machines are servers located near the edge of the Internet, i.e., at or adjacent end user access networks. A network operations command center (NOCC) 104 may be used to administer and manage operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers. As illustrated in FIG. 2, a given machine 200 comprises commodity hardware (e.g., an Intel Pentium processor) 202 running an operating system kernel (such as Linux or variant) 204 that supports one or more applications 206*a-n*. To facilitate content delivery services, for example, given machines typically run a set of applications, such as an HTTP web proxy 207 (sometimes referred to as a "global host" or g-host process), a name server 208, a local monitoring process 210, a distributed data collection process 212, and the like. For streaming media, the machine typically includes one or more media servers, such as a Windows Media Server (WMS) or Flash 2.0 server, as required by the supported media formats.

The CDN DNS query handling mechanism directs each user request to an IP address associated with a given CDN server for content delivery. In one approach to implementing this mechanism, a "top level" map directs a specific query to one of a given number of server regions, while a "low level" map further directs the request to one or more IP addresses associated with one or more respective CDN content servers within a region. This multi-level DNS query handling approach is not meant to be limiting, as any approach may be used to direct a DNS query to a particular CDN name server that alone or with other devices returns an IP address associated with one or more CDN servers.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Figure 3:
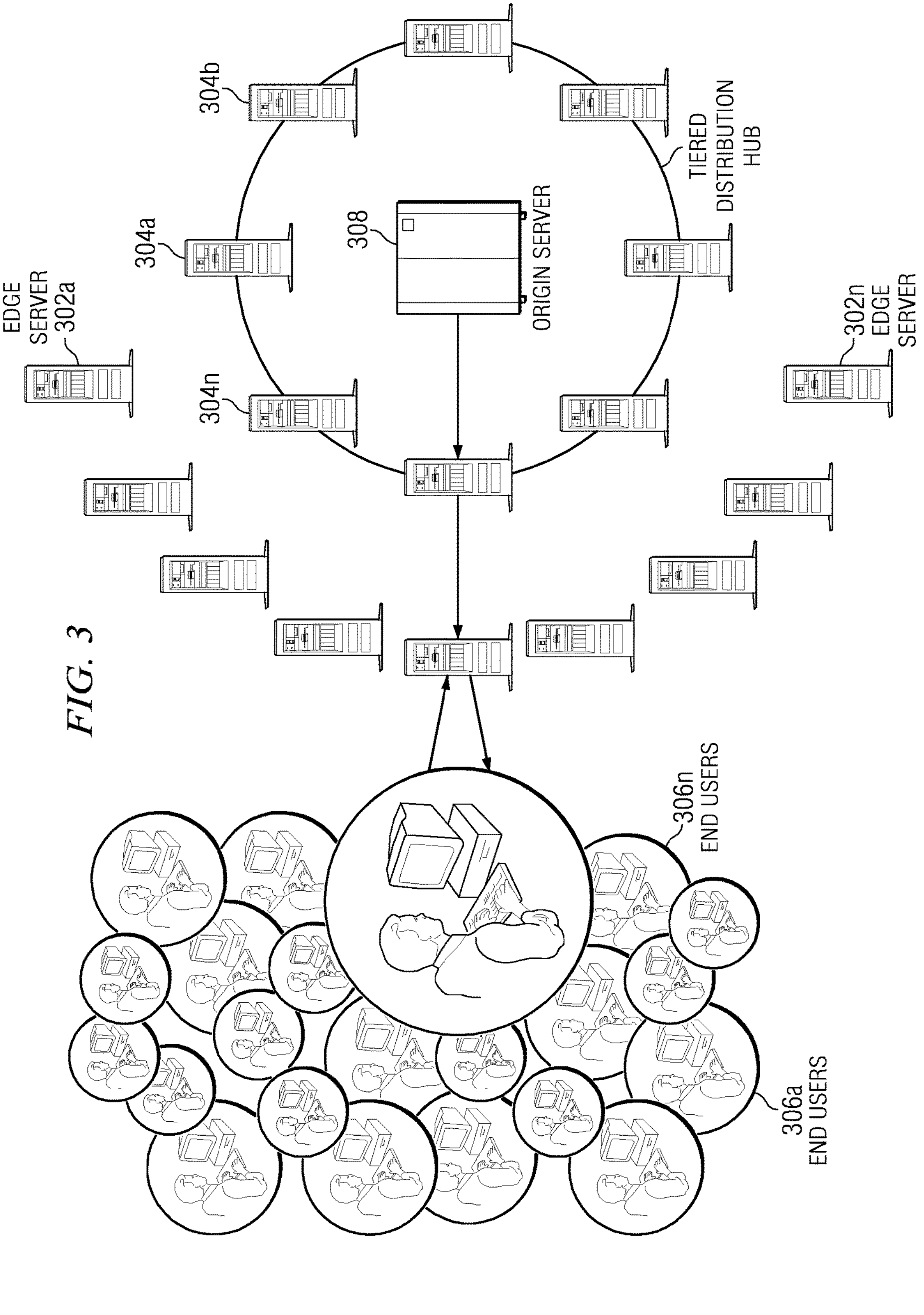
FIG. 3 is a representative CDN that implements a tiered distribution.

If configured appropriately, given subsets of edge servers may comprise a cache hierarchy so that edge server may "go forward" to a CDN parent instead of to the origin server as needed. This tiered distribution is described in U.S. Pat. No. 7,133,905. In such case, the CDN employs a tiered infrastructure using two or more tiers: a set of edge servers and a hierarchical set of "parent" or hub regions that service the edge servers. With reference to FIG. 3, which is representative, the CDN service provider operates a plurality of CDN edge server machines 302*a-n* and a set of tiered distribution hubs 304*a-n*. The tiered distribution hubs accelerate content delivery to end users 306*a-n* and buffer the origin server 308. The tiered distribution hubs ensure that the edge servers have the information requested by the end users. If the edge servers do not have the appropriate file when it is requested, the servers in the tiered distribution hubs will provide the edge servers with the requested content. Preferably, a tiered distribution hub 304 maintains a persistent connection to the origin server 308, although this is not a requirement. The distribution hubs ensure that end users 306 do not flood the origin site with requests if the site is experiencing high traffic load or if the content is stale, large, or infrequently accessed. In effect, the tiered distribution hubs act as accelerators for the end users, ensuring that the users obtain their desired content quickly and reliably, and the hubs acts as buffers for the origin site's internal infrastructure, guaranteeing that the site is not overwhelmed with requests for popular content or large files.

Figure 4:
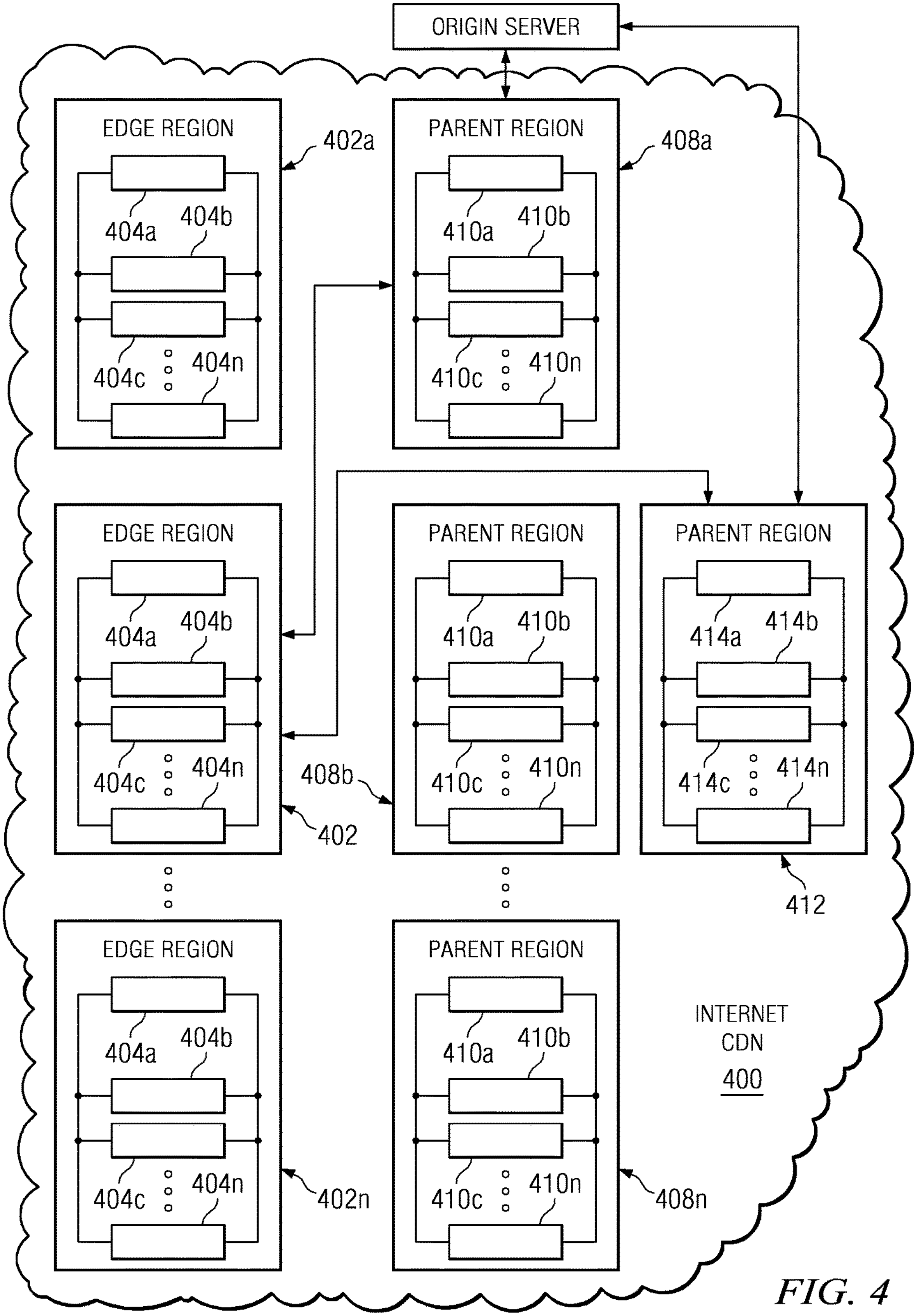
FIG. 4 is a more detailed illustration of the tiered distribution.

As illustrated in FIG. 4, a given content delivery network 400 may comprise a set of regions 402*a-n*, each of which comprises a set of content (or "edge") servers 404*a-n*. CDN customers include a set of content providers (CPs), each of which typically operates a set of one or more origin servers 406. Typically, when a given requested object is not available from a given content server 404, the object may be retrieved from another edge server in the region or, failing that, from the origin server. This known operation may be implemented as described in U.S. Pat. No. 7,133,905. In particular, given content may be marked for distribution from a so-called cache hierarchy that includes a given edge region 402 and either (a) a given subset of the origin server regions (a "multi-region" cache hierarchy) or (b) a dedicated single parent region (a "single-region" cache hierarchy). In the illustrated example, the given subset of parent regions includes regions 408*a-n*. A given region 408 includes a cluster of "parent" servers, for example, server machines 410*a-n* that, for illustrative purposes only, may be co-located in large hosting data centers in well-connected "core" portions of the Internet web hosting infrastructure. Representative "core" locations include, without limitation, well-connected data centers in the Internet that have high-speed backbones (today these are optical networks running at multiple gigabits per second) and are connected to at least several (e.g., three (3)) other high-speed optical backbone networks. Connection to multiple backbone networks is very desirable to ensure requests can be routed quickly and reliably within the Internet. The number of parent regions in the given subset is variable and their particular location and configuration (e.g., number of servers, connectivity, etc.) is selectable, however, these machines should be relatively powerful and well-connected. An alternative to the multi-region cache hierarchy is a "single region" hierarchy that includes a given edge server region 402 and the single parent region 412 having a cluster of servers 414*a-n*. Again, the location of the parent region and the number of servers within that region and their connectivity are variable. Typically, however, the single parent region 412 is associated with a particular content provider and may be located nearby the content provider's origin server or server farm. The single parent region may also be located on the same provider network and geographically close.

By funneling requests that cannot be serviced in edge regions (because the object is not in cache or is in cache but needs to be validated) through either the multi-region or single-region parent clusters, the CDNSP significantly reduces the amount of traffic on content provider origin servers for very popular content and large, potentially flash-sensitive objects. As a result, the cache hierarchy protects the content providers from requests for large, popular objects causing the CDN to make more requests than the content provider can handle. In addition, the cache hierarchy reduces average latency and improves connectivity and content access in what might otherwise be poorly-connected edge regions. Preferably, only a relatively small, specific subset of objects are serviced using the hierarchy, while most objects are fetched using a default mechanism where the edge server contacts the origin server to handle a request that cannot be serviced in the edge region. This selectivity is accomplished preferably using object metadata that is delivered to the CDN servers using the distributed data transport mechanism. Preferably, the data is distributed via structured files, such as XML.

With the above as background, the following describes a set of techniques for configuring a CDN for a customer site with a large amount of content (footprint) that is infrequently requested (cold).

Because the nature of the content may require special CDN server configuration and monitoring, it is important to evaluate whether a customer represents a potential cold content risk. This will vary with customer, of course. Nevertheless, to some extent the risk can be identified through evaluating a metric. For example, is the total footprint larger than a given number (e.g., 200) gigabytes, and is the traffic greater than a given (e.g., 2) Gbps? Such thresholds may indicate a potential cold content situation. Some specific guidelines based on size of footprint and rate of traffic are provided below. Certain Internet businesses lend themselves to cold content including, without limitation, social networking sites, auction sites, community-focused sites, and the like. Also, certain applications tend to generate cold content, such as user-generated content, progressive download streaming, maps and social applications. Thus, the nature of the site or site application may dictate whether the content in question should be managed by the CDNSP as "cold content."

Typically, the shear footprint size for a customer provides a good hint at the potential for a long tail of cold content. The following are various factors that may be considered when evaluating a customer's site: total content size (how many gigabytes of content are involved), size of objects served (e.g., video downloads), unique content (customized for individual users, the response may be cacheable, but caching may provide very low benefit because only one or very few users will ever reference the particular object), total number of objects (there are many, many objects, it is unlikely they are all of interest, even if they are cacheable), active footprint (e.g., what percent of the total content will account for, say, 90% of the bits served; if this number is low (10-20%), it is likely long tail), and the like.

The following is a list of features and configuration options to improve cache hit rates and origin off-load when confronted by a large quantity of cold content. These features and configurations may be defined at the particular CDN server using the approach described above, i.e., an XML-based configuration file that includes a set of rules and directives that facilitate one or more cold content handling features. Then, when an edge server management process (g-host) receives a request for content, it searches an index file for a match on a customer hostname associated with the request. If there is no match, the edge server process rejects the request. If there is a match, the edge server process loads metadata from the configuration file to determine how it will handle the request. That handling process is described in U.S. Pat. No. 7,240,100.

I. Features

Longer TTL's

When content is cacheable but likely to be cold, it is desirable to set the TTL's a high as possible (e.g., 365 days, or the like) so that if the content is in cache, the origin server is not contacted with an If-Modified-Since (IMS) request for the object. The large number of unique requests may already be enough load on the origin, so any small amount that can be off-loaded should be. This is desirable if the origin server does not check for the IMS header and instead always responds with an HTTP 200.

```
<cache:max-age>_d</cache:max-age>
```

304 Optimization

Some web sites follow a policy of never changing an object in place. That is, if the object changes, the URI for that object also changes in some way. For web sites that follow a policy of this type, it may be appropriate to configure the CDN server to respond to all IMS requests with an http 304 Not Modified response even if the object is not in cache. In particular, because the object is known never to change, it is not relevant whether the CDN server can confirm the current Last-Modified date. The copy held by the client is already the only possible copy.

To configure an http 304 response, the content server is configured (through metadata) to match on the presence of an IMS header and send a constructed 304 Not-Modified response.

Tiered Distribution

As noted above, tiered distribution, using either a normal map or a small map, addresses low cache hit rates by aggregating hits in a smaller set of regions. By funneling many edge server requests through the parent regions, each object receives a higher hit-rate on the parent server and has a better chance of persisting in cache, thus avoiding a hit on the origin server.

The smaller the tiered distribution map, the higher the concentration of requests for each object. So, it may be desirable to use a smaller tiered distribution map in the case of very low popularity objects.

```
<forward:cache-parent>
  <status>on</status>
  <selection-method>serial-prepend</selection-method>
  <policy>tiered-distribution</policy>
  <map>ch.akamai.net</map>
</forward:cache-parent>
```

Smaller Edge Map

In some cases, a smaller edge map (a map that directs DNS queries to a relatively small subset of the content delivery network regions) may be used as a way to increase the cache-hit rate of the content.

Multiple Edge Hostnames/Serial Numbers

In a typical mapping configuration, a customer hostname maps to a CDN hostname, which further resolves to a given number (e.g., two) content servers within a CDN region. This mapping of the request to only a given number out of several possible servers in the region helps to ensure that object is found on the content server and avoids duplicating the content on multiple servers in the region.

One technique for mapping CDN hostnames uses hostnames that may include serial numbers and is described, for example, in U.S. Pat. No. 6,108,703, which is incorporated herein by reference.

Figure 5:
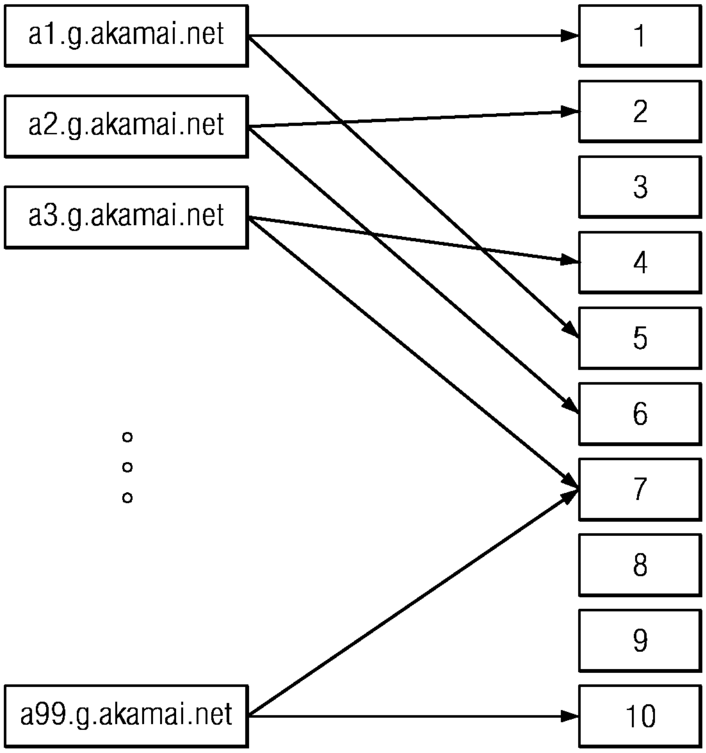
FIG. 5 illustrates multiple hostnames per serial number mapping.

If the total footprint of customer content is large, it may be desirable to assign the customer multiple edge serial numbers to spread the requests across more servers in a region. This is illustrated in FIG. 5, where several domain names (on the left) are shown mapped to edge servers within a particular CDN region. This technique can be a benefit to both the specific customer (by preventing cache contention among its own content), and other customers using the same map (by preventing cache contention between customers). In particular, if the request load is high, spreading the requests across multiple servers may be helpful to ensure that a single server is not overloaded. By assigning multiple serial numbers, rather than spreading a single serial number across multiple servers, this approach helps avoid the problem of duplicating content on multiple servers in the region.

Hash Serial and Forward

While the multiple edge hostnames approach provides some advantages, a preferred technique for spreading content across multiple servers in a region is now described. It is referred to herein as hash serial and forward (HSAF). The HSF technique creates serial number spreading, preferably by hashing a cache key into a serial number and forwarding the request to an in-region peer (in other words, another CDN server) across a back-end interface of content servers within a region. This technique is illustrated in FIG. 6. HSAF spreads the requests across the region in a consistent manner without requiring the extra DNS resolutions implied by using multiple hostnames for the content. HSAF, however, restrains uncontrolled spread of the customer's footprint throughout the CDN.

The following is representative metadata for the hash serial and forward functionality. This metadata is found in the separator forward:hash-serial-and-forward.

```
<forward:hash-serial-and-forward>
  <status>on</status>
  <tier>edge</tier>
  <rehash>off</reshash>
  <save-object>off</save-object>
  <min>1200</min>
  <max>1399</max>
</forward:hash-serial-and-forward>
```

Forward Rate Limiting

Forward rate limiting is implemented primarily to address the problem of spikes in origin load during any period of transition. Events such as content purges, mapping changes, region suspensions, and publication of new content have the potential to increase load on the origin server while the CDN cache is (re)populated with content. Forward rate limiting prevents this load from reaching levels that might threaten the origin infrastructure.

The following metadata may be used to implement forward rate limiting on the CDN edge server:

```
<forward:rate-limit>
  <status>on</status>
  <slow-tcp-connect-ms>_____</slow-tcp-connect-ms>
  <slow-read-ms>_____</slow-read-ms>
  <slow-ss1-connect-ms>0</slow-ss1-connect-ms>
  <slow-write-ms>0</slow-write-ms>
  <queue-max-wait-ms>_____</queue-max-wait-ms>
  <max-concurrent-connects>___</max-concurrent-connects>
  <load-decrease-factor-on-slowness>___</load-decrease-factor-on-
  slowness>
  <load-increase-factor-on-success>_</load-increase-factor-on-success>
</forward:rate-limit>
```

Popularity Threshold

If an origin response is cacheable, by default the CDN server will cache it on first retrieval from the origin server. This is not always the most effective use of the cache for a content provider. In particular, if a content provider has a disk quota imposed and they find that objects are evicted from cache due to that quota, it may be desirable to cache an object only after it is clear that the object is popular (that is, it will be requested by clients fairly frequently).

The CDN server can be configured to cache a response only after it has received a few requests for the object. The number of requests required before the object is cached is configurable (e.g., from 1 to 4). The period of time within which the objects must be re-requested may also be configurable (e.g., 8 hours).

This option may be applied to a subset of the web site if certain requests are more likely to be unpopular. For example, one may choose to cache the image of an auction item only if the image has been requested more than once in an hour so as to avoid having requests for unpopular images cause popular ones to be evicted from cache due to disk quotas. At the same time, one may decide to place no such control on other content of higher priority, such as HTML pages.

The metadata tag to configure this feature is:

<cache:popularity-threshold.value>_</cache:popularity-threshold>

CPCode Quotas

CPCode quotas control the total footprint or how many total objects a single content provider (CP) code can use on a CDN server.

Multi-Tier Cache Hierarchy

A multi-tier cache hierarchy solution may provide for additional origin offload, particularly in the event that a region in the tiered distribution map is taken out of service for any reason. With a single-tier cache hierarchy, loss of a region would potentially require a new region to populate its cache from the origin server. With the two-tier configuration, the new region would populate its cache from the second tier, thus greatly reducing the likelihood of increased load at the origin.

A multi-tier cache hierarchy approach is shown in FIG. 7. As can be seen, any client request to the edge server g-host process (e.g., E1) is handled using hash serial and forward (as described above) to spread the requests in the edge region. If the edge region does not yet have the content in cache, the request is forwarded to one of the cache hierarchy tiers. The choice of tier map may be made randomly. If the content is not on the first tier parent, that parent forwards the request to the second tier. If the second tier does not have the content the request may then be forwarded to the origin server. When the origin server returns the object, preferably the response is cached in all three locations (edge, tier 1, and tier 2) to provide the redundancy necessary to better ensure that this object is available in cache for future client requests.

This multi-tier configuration can be configured in metadata with the following logic: (i) set variables to contain the map names for the first tier map (TD0), the second tier map (TD1), and the default cache-h map (TD_DEFAULT) for this request; (ii) for a given (e.g., 50) % of these requests, reverse the map assignments (in this example, half go to the second tier as the first tier); (iii) specify a cache-h map using DEFAULT; (iv) if the request is a client request, provide a set of headers to record the hop progress, the serial numbers, and the map names to be used for each hop (as assigned at the top of the metadata file); (v) if the request is not a client request and not an ICP request, and a special "edge-region" header is in place, then the first hop to TD0 from the edge has been made (in which case replace the identifying "edge-region" header with the "tier0" header, update the hop count header, and set the cache-h map to use the TD1 value so that the ghost will go forward to the next tier if it needs to go forward); and (vi) if the request is not a client request and not an ICP request, and the special "tier0" header is in place, then the hop to TD1 is made already. At this point, only the reporting header needs to be set. The cache-parent settings result in an in-region peer error, and the server cache manager will go forward to the origin on the next hop if it needs to go forward.

II. Configurations

The following are several possible configurations for use with sites that have been identified as serving a large quantity of cold content. The decision may be based by balancing (trading off) footprint, traffic, and number of objects, such as indicated by the Table in FIG. 8.

Configuration A

This configuration would include, for example, one or more of the above-described features such as:

- Edge Map: c.akamai.net (the "c" map)
- Tiered Distribution: Small CacheH Maps
- Forward Rate Limiting: optional (implement using defaults if the origin needs it to control spikes)
- 304 optimization if possible Configuration B This configuration would include, for example, one of more of the above-described features such as:

- Edge Map: small (default is "c.akamai.net")
- Tiered Distribution: single tier custom patterns names
- Hash Serial and Forward: optional (default serials 1200-1399)
- Forward Rate Limiting: optional (implement if the origin needs it to control spikes
- 304 optimization if possible
- CPCode min/max quota, if needed.

The following metadata (© 2007 Akamai Technologies, Inc.) may be used to implement Configuration B:

```
<configs xsi:noNamespaceSchemaLocation=". . /schemas/metadata.xsd">
-
   <akamai:edge-config version="5.0">
<!-- Begin configurable portion per customer -->
<!-- Specify origin, TTL, etc -->
<!-- End configurable portion per customer -->
-
   <!--
Optional FRL: Origin is called slow if it takes _ seconds to establish
   connection, or to first-byte (ss1 and write times to origin are
   ignored). Max __ concurrent new connection attempts per server, max
   wait of __ seconds for any request in the queue. Load reduced by ___%
   each time the origin is found to be slow, and increased by ___% if it
   is found to be not slow
-->
-
   <forward:rate-limit>
      <status>on</status>
      <slow-tcp-connect-ms>_____</slow-tcp-connect-ms>
      <slow-read-ms>_____</slow-read-ms>
      <slow-ss1-connect-ms>_____</slow-ss1-connect-ms>
      <slow-write-ms>_____</slow-write-ms>
      <queue-max-wait-ms>_____</queue-max-wait-ms>
      <max-concurrent-connects>___</max-concurrent-connects>
      <load-decrease-factor-on-slowness>___</load-decrease-factor-on-
   slowness>
      <load-increase-factor-on-success>___</load-increase-factor-on-
   success>
   </forward:rate-limit>
<!-- Turn on HSAF -->
-
   <forward:hash-serial-and-forward>
      <status>on</status>
      <tier>edge</tier>
      <save-object>off</save-object>
      <min>1200</min>
      <max>1399</max>
   </forward:hash-serial-and-forward>
<!-- Specify cacheH -->
-
   <forward:cache-parent>
      <status>on</status>
      <map>HCH_MAPNAME0.some.akamaidomain.net</map>
```

-continued

```
    <selection-method>serial-prepend</selection-method>
    <policy>tiered-distribution</policy>
  </forward:cache-parent>
-
  <match:random value="50">
    <forward:cache-
  parent.map>HCH_MAPNAME1.some.akamaidomain.net</forward:cache-
  parent.map>
  </match:random>
-
  <!--
Popularity threshold placeholder, set to the default value
-->
    <cache:popularity-threshold.value>1</cache:popularity-
  threshold.value>
  </akamai:edge-config>
</configs>
```

Configuration C

This configuration would include, for example, one of more of the above-described features such as:

Small Edge map

Hash Serial and Forward: hash at both tiers (default serial ranges of 1200-1399 at the edge and 1400-1589 at the parent)

Two-tier CacheH: custom pattern names, as needed

Forward Rate Limiting

CPCode min/max quotas, if needed

The following metadata (© 2007 Akamai Technologies, Inc.) may be used to implement Configuration C:

```
<!-- Begin Configurable portion per customer -->
<!-- Insert origin/TTL etc. detail here -->
-
  <!--
Variables specifying the two cacheH maps. The path is: Edge, TD0, TD1,
  origin.If 2-tier cacheH is turned off, TD_DEFAULT may be used as the
  only cacheH map
-->
-
  <assign:extract-value>
    <location>Metadata</location>
    <variable-name>TD0</variable-name>
    <variable-value>HCH_MAPNAME0.some.akamaidomain.net</variable-
  value>
  </assign:extract-value>
-
  <assign:extract-value>
    <location>Metadata</location>
    <variable-name>TD1</variable-name>
    <variable-value>HCH_MAPNAME1.some.akamaidomain.net</variable-
  value>
  </assign:extract-value>
-
  <assign:extract-value>
    <location>Metadata</location>
    <variable-name>TD_DEFAULT</variable-name>
    <variable-value>HCH_MAPNAME0.some.akamaidomain.net</variable-
  value>
  </assign:extract-value>
<!-- For half the requests, reverse the map sequence -->
-
  <match:random value="50">
-
    <assign:extract-value>
    <location>Metadata</location>
    <variable-name>TD0</variable-name>
    <variable-value>HCH_MAPNAME1.some.akamaidomain.net</variable-
  value>
  </assign:extract-value>
-
  <assign:extract-value>
    <location>Metadata</location>
    <variable-name>TD1</variable-name>
    <variable-value>HCH_MAPNAME0.some.akamaidomain.net</variable-
  value>
```

-continued

```
    </assign:extract-value>
  -
    <assign:extract-value>
      <location>Metadata</location>
      <variable-name>TD_DEFAULT</variable-name>
      <variable-value>HCH_MAPNAME1.some.akamaidomain.net</variable-
    value>
    </assign:extract-value>
  </match:random>
  <!-- End Configurable portion per customer -->
........   ............
  <!--Specify cacheH -->
  -
    <forward:cache-parent>
      <status>on</status>
      <map>a% (AK_SERIAL) .% (TD_DEFAULT)</map>
      <selection-method>domain-lookup</selection-method>
      <policy>tiered-distribution</policy>
    </forward:cache-parent>
  <!--
    If this is the client request, then set flag indicating this is the
    edge region, set the first cacheH map, and put the second map in the
    request header
  -->
  -
    <match:request.type value="CLIENT_REQ">
  -
    <forward:hash-serial-and-forward>
      <min>1200</min>
      <max>1399</max>
    </forward:hash-serial-and-forward>
  -
    <edgeservices:modify-outgoing-request.add-header>
      <status>on</status>
      <name>mmk-is-edge-region</name>
      <value>1</value>
    </edgeservices:modify-outgoing-request.add-header>
  -
    <edgeservices:modify-outgoing-request.add-header>
      <status>on</status>
      <name>mmk-first-cacheh-hop</name>
      <value>%(TD0)</value>
  </edgeservices:modify-outgoing-request.add-header>
-
  <edgeservices:modify-outgoing-request.add-header>
    <status>on</status>
    <name>mmk-last-cacheh-hop</name>
    <value>%(TD1)</value>
  </edgeservices:modify-outgoing-request.add-header>
</match:request.type>
<!--
```

If this request is circulating in the ghosts of a region; if this is the tier0 region, then set the parent map of whatever tier1 happens to be. This logic automatically sets tier1's cacheH parent map to itself

```
-->
-
  <match:client.ip result="true" value="10.0.0.0/8">
-
  <match:request.header name="mmk-is-edge-region" value="1">
<!-- Request is circulating in tier-0 parent -->
-
  <!--
  grab the next cacheH tier from the request header
-->
-
  <assign:extract-value>
    <location>Client_Request_Header</location>
    <location-id>mmk-first-cacheh-hop</location-id>
    <variable-name>TDNEXT</variable-name>
  </assign:extract-value>
```

-continued

```
    <forward:cache-
  parent.map>a% (SERIALNEXT) .% (TDNEXT)</forward:cache-parent.map>
</match:request.header>
-
  <match:request.header name="mmk-is-tier0-region" value="1">
-
  <!--
Request is circulating in tier-0 parent, grab the next cacheH tier
  from the request header
-->
-
  <assign:extract-value>
    <location>Client_Request_Header</location>
    <location-id>mmk-last-cacheh-hop</location-id>
    <variable-name>TDNEXT</variable-name>
</assign:extract-value>
    <forward:cache-
  parent.map>a% (SERIALNEXT) .% (TDNEXT)</forward:cache-parent.map>
</match:request.header>
</match:client.ip>
```

The following section provides additional examples of how to set up content delivery on behalf of a social network web site and specific XML-based metadata tags that can be used for this purpose. The metadata is provide to the edge server using a data transport mechanism or other convenient communication method.

As noted above, much of the content on a social networking site is user generated such that the site has a very large footprint. The content typically is not popular, and each object may only get a few hits/day, especially for small social network groups; this significantly reduces the probability of a cache hit at the edge. To address cold content, several strategies have been described, such as:

- Setup for first type of social media web site
  - Only one occurrence of an object will be stored within a region; this increases the region capacity in storing objects (hash serial and forward).
  - Forward rate limiting
  - Cache hierarchy (cacheh)
- Setup for second type of social media web site (with very large footprint)
  - small edge map (cold content edge map)
  - small cache parent map (cold content parent map)
  - Multi-hop parent (2-tier parent hierarchy)

Preferably, a site's content footprint is striped across a set of cache hierarchy regions. In one example, a set of serial numbers are hashed according to a consistent hashing scheme, so that a first subset of the serial numbers is associated with a first cache hierarchy region, a second subset of the serial numbers is associated with a second cache hierarchy region, and so on. This helps to maintain high cache hit ratios in cache hierarchy intermediate regions.

The following provides additional details of the above-described techniques.

Hash Serial and Forward

As noted above, the tag <forward:hash-serial-and-forward> is used to control the hash serial and forward functionality. When the feature is enabled, the edge server hashes a serial number from the incoming request URL and uses that serial number in combination with a map rule to forward to the request to an in-region peer across server region back-end connections. This is useful for reducing traffic to the origin server or for avoiding duplication of content that is large and infrequently requested. To use the tag:

<forward:hash-serial-and-forward.status>on</forward:hash-serial-and-forward.status>

The following tag controls whether the server that initiates the hash-serial-and-forward request will save the response in its own cache <forward:hash-serial-and-forward.save-object>off</forward:hash-serial-and-forward.save-object>

The following tags establishes the minimum and maximum integer value that can be used for the serial number <forward:hash-serial-and-forward.min>900</forward:hash-serial-and-forward.min>

<forward:hash-serial-and-forward.max>949</forward:hash-serial-and-forward.max>

The above-recited description (using HSAF) is not meant to be limiting. More generally, at the edge server given information is hashed to effect a partition of the content, with partitions identified by keys containing hashed values of URLs and/or request headers. A mapping of partition keys to servers may then be published from a central component to the edge servers (e.g., using DNS, or via metadata communication channels).

Choosing a Parent Region Based on the Hashed Serial:

Upon a cache miss at the edge server and on all other servers in the edge region, the request is forwarded to a parent server. Preferably, the parent server is located by looking up a DNS name, which is constructed dynamically by including the hash-serial value on the edge server, as computed by the hash-serial-and-forward feature. The name server that handles the resolution of this DNS name preferably makes this decision based on a parent selection rule. This rule divides the hash range into a small number of sub-ranges and assigns a parent to each sub-range that is not shared with any other sub range. This rule allows the utilization of the entire capacity of the parent tier, while preventing the spread of the same content across all the regions in the parent tier. Preferably, a similar rule determines the parent at the next tier, in the case of a miss at the parent.

The Server Initiating the ICP Request Does Not Cache the Object

A request made to a peer within the same region may not be cached to increase the region capacity and thus increase the probability to have a cache-hit within the region. The following tag provides the function.

```
<match:client.ip value="10.0.0.0/8">
  <edgeservices:modify-outgoing-response.add-header>
    <name>AK-Control</name>
    <value>no-store</value>
    <status>on</status>
    <edge-only>off</edge-only>
  </edgeservices:modify-outgoing-response.add-header>
</match:client.ip>
```

Cache TTL Set to 365 Days

This tag increases the amount of time an object is kept in cache, may increase the probability of a cache hit.

<cache:max-age>365d</cache:max-age>

The number of days may be varied from 365.

Downstream TTL Set to 365 Days

This tag reduces the number object download from the server to the end user, the cache age TTL for the browser is set to 365 days.

```
<match:request.type value="CLIENT REQ" result="true">
  <edgeservices:modify-outgoing-response.add-header>
    <name>Cache-Control</name>
    <value>max-age=31536000</value>
    <status>on</status>
    <edge-only>on</edge-only>
  </edgeservices:modify-outgoing-response.add-header>
```

The number of days may be varied from 365.

Limit Number of Forward Requests Attempts

The tag <forward:availability.max-reconnects> sets the number of times a CDN server will attempt a forward connection before serving an error or taking the fail-action to serve the client request. The number of attempts is defaulted to 1 to prevent delay in providing a response to the client in the event the object is not found. The number of attempts may be set to other values.

```
<forward:availability.max-reconnects > 1 </forward:availability.max-reconnects>
  <match:response.status value="404">
    <cache:negative-tt12>
      <status>on</status>
      <value>3h</value>
    </cache:negative-tt12>
  </match:response.status>
```

In the above example, negative TTL are cached for 3 hours; this reduces the number of queries forwarded to the origin. The negative TTL value may be set at any convenient value.

Asynchronous DNS Refresh

Asynchronous DNS refresh prevents any delay due to name resolution and therefore prevent any delay of the response to the user.

```
  <network:dns.async-refresh.status>on</network:dns.async-
refresh.status>
  <forward:cache-parent.status>on</forward:cache-parent.status>
  <forward:cache-parent.selection-method>serial-prepend</forward:cache-
parent.selection-method>
  <forward:cache-parent.policy>tiered-distribution</forward:cache-
parent.policy>
  <forward:cache-parent.map>chwus.akamal.net</forward:cache-parent.map>
```

Multihop Parents

- Parents regions are peered together
- If a parent region goes down and a request arrive for an object not present in the cache parent region, the request will be forwarded to a second cache parent region
- If the object is not available in the second cache region, the request will eventually be forwarded to the origin server
- Increases the cache hit ratio and the origin offload Preferably, there are two tiers of parents between the edge and the origin and that are contacted in case of cache misses as described earlier. If edge servers always forward the requests to parent servers of tier TD0 on a miss, and TD0 regions forward it to TD1 on a miss, then the cache populations of TD0 and TD1 end up being uneven over time. With uneven cache populations, failure of any region in the TD0 tier may have a severe impact on overall cache hit ratios. Thus, instead of using a deterministic choice of parent tiers, it may be desirable to use a probabilistic rule for making the parent choice at the edge, e.g.: 50% of the times, the path from the edge server to the origin is edge→TD0 region→TD1 region→origin, and remaining times, it is edge→TD1 region→TD0 region→origin. This allows an even (or substantially even) population of the regions in both the tiers, which provides a much higher resilience to region failures.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

Having described our invention, what we claim is as follows.

The invention claimed is:

1. A method of content handling in an edge region of a content delivery network, the edge region comprising a set of peer machines, wherein each peer machine of the set comprises a processor, and a cache, comprising:

receiving a request at a first one of the peer machines, the request having associated therewith a hostname having a value that points to peer machines in the edge region to facilitate load balancing, the value configured for use as a cache key, the request being one of a set of requests associated with the hostname received in the edge region;

in response to receiving the request, hashing the cache key that includes the value to create a hashed value that also points to one or more other peer machines in the set of peer machines;

based on the hashed value, forwarding the request to at least one other peer machine pointed to by the hashed value; and at the other peer machine, using the hashed value as a cache key for responding to the request;

wherein hashing of the cache key and forwarding of the request facilitate spreading of the set of requests associated with the hostname across the set of peer machines.

2. The method as described in claim 1 wherein the value is a serial number.

3. The method as described in claim 1 wherein the set of peer machines are connected to one another across a back-end interface in the edge region.

4. The method as described in claim 3 wherein hashing the cache key spreads the value across the set of peer machines.

5. The method as described in claim 1 further including configuring each of the peer machines of the set of peer machines to perform the hashing of the cache key and forwarding of the request.

6. The method as described in claim 1 wherein the set of peer machines comprise a tier of a cache hierarchy.

7. The method as described in claim 1 wherein the request is associated with a content object.

8. The method as described in claim 7 wherein, based on a number of requests per a given time period, the content object is defined as cold content.

9. The method as described in claim 8 wherein the other peer machine serves the cold content and caches it in its cache.

10. The method as described in claim 9 wherein the cold content is spread across the set of peer machines.

* * * * *